United States Patent
Burchardt et al.

(10) Patent No.: US 7,980,840 B2
(45) Date of Patent: Jul. 19, 2011

(54) MOULD AND METHOD FOR VACUUM ASSISTED RESIN TRANSFER MOULDING

(75) Inventors: Claus Burchardt, Gistrup (DK); Allan Hurup, Nibe (DK); Michael Nørlem, Svenstrup (DK); Bendt Olesen, Klarup (DK); Henrik Stiesdal, Odense (DK)

(73) Assignee: Siemens Aktiengesellschaft, Munich (DE)

( * ) Notice: Subject to any disclaimer, the term of this patent is extended or adjusted under 35 U.S.C. 154(b) by 81 days.

(21) Appl. No.: 12/383,959

(22) Filed: Mar. 31, 2009

(65) Prior Publication Data

US 2009/0250847 A1 Oct. 8, 2009

(30) Foreign Application Priority Data

Apr. 3, 2008 (EP) ..................... 08006813

(51) Int. Cl.
*B29C 70/36* (2006.01)
*B29C 70/28* (2006.01)

(52) U.S. Cl. ............. 425/129.1; 264/258; 264/261; 264/102; 264/511; 425/504; 425/117; 425/85; 425/405.1

(58) Field of Classification Search .......... 264/257, 264/258, 261, 102, 511; 425/117, 129.1, 425/120, 504, 405.1
See application file for complete search history.

(56) References Cited

U.S. PATENT DOCUMENTS

| | | | | |
|---|---|---|---|---|
| 4,120,632 A * | 10/1978 | Stoeberl | ............... | 425/405.1 |
| 5,393,215 A * | 2/1995 | Donovan, Sr. | ............... | 425/129.1 |
| 5,518,385 A * | 5/1996 | Graff | ............... | 425/127 |
| 5,714,175 A * | 2/1998 | Masui et al. | ............... | 425/123 |
| 5,741,450 A * | 4/1998 | Monroe | ............... | 264/102 |
| 5,785,910 A * | 7/1998 | Sakashita et al. | ............... | 264/45.5 |
| 6,004,498 A * | 12/1999 | Fujii et al. | ............... | 264/255 |
| 6,017,484 A * | 1/2000 | Hale | ............... | 264/510 |
| 6,030,560 A * | 2/2000 | Bortz, Jr. | ............... | 264/46.4 |
| 6,054,087 A * | 4/2000 | Noirot et al. | ............... | 264/251 |
| 7,081,219 B2 * | 7/2006 | Stewart | ............... | 264/40.5 |
| 7,473,385 B2 * | 1/2009 | Stiesdal et al. | ............... | 264/314 |
| 7,722,348 B1 * | 5/2010 | Quenneville et al. | ............... | 425/121 |
| 2004/0130072 A1 * | 7/2004 | Sekido et al. | ............... | 264/408 |
| 2007/0145622 A1 * | 6/2007 | Cicci et al. | ............... | 264/40.1 |
| 2007/0274835 A1 * | 11/2007 | Stiesdal | ............... | 416/230 |
| 2008/0044506 A1 | 2/2008 | Zahlen et al. | | |
| 2008/0150186 A1 * | 6/2008 | Abrams | ............... | 264/130 |
| 2010/0166998 A1 * | 7/2010 | Bannister et al. | ............... | 428/61 |

FOREIGN PATENT DOCUMENTS

| | | |
|---|---|---|
| EP | 0 785 062 A2 | 7/1997 |
| EP | 1 310 351 A1 | 5/2003 |
| WO | WO 00/41866 A1 | 7/2000 |
| WO | WO 2006/058540 A1 | 6/2006 |
| WO | WO 2006/058541 A1 | 6/2006 |
| WO | WO 2007/038930 A1 | 4/2007 |

* cited by examiner

*Primary Examiner* — Kat Wyrozebski
*Assistant Examiner* — Nahida Sultana

(57) ABSTRACT

A mold and method for vacuum assisted resin transfer molding of a fiber reinforced laminated structure are provided. The mold includes a first mold part and a second mold part. The first mold part defines a negative impression of the laminated structure, being structurally stable and forming a support for fiber reinforcement layers of the laminated structure. The second mold part connectable to the first mold part for closing the mold and defines together with the first mold part an enclosed space which can be evacuated. The mold further includes a flow duct for guiding a liquid polymer which is formed as a recess in the first mold part and/or a recess in the second mold part that is open towards the enclosed space and extends along a section of the periphery of the first mold part and/or the second mold part.

12 Claims, 3 Drawing Sheets

US 7,980,840 B2

MOULD AND METHOD FOR VACUUM ASSISTED RESIN TRANSFER MOULDING

CROSS REFERENCE TO RELATED APPLICATIONS

This application claims priority of European Patent Office application No. 08006813.3 EP filed Apr. 3, 2008, which is incorporated by reference herein in its entirety.

FIELD OF INVENTION

The present invention relates to a mould for a vacuum assisted resin transfer moulding of a fibre laminated structure, in particular of a wind turbine rotor blade, and to a method for vacuum assisted resin transfer moulding.

BACKGROUND OF INVENTION

Vacuum assisted resin transfer moulding (VARTM) of large structures has to date involved in the inclusion of conduits for resin distribution into the moulded structure. Examples therefore are disclosed in EP 1 310 351 B1, WO 2006/058540 A1, WO 2006/058541 A1, and WO 2007/038930 A1.

EP 1 310 351 B1 describes a mould for wind turbine rotor blades which comprises a lower mould part, an upper mould part, and a core. For forming a laminated rotor blade, fibre reinforcement layers are layered in the lower mould part and the core is put atop on the layers. Layer sections projecting over the lower mould are then wound around the core so as to overlap in the middle of the core and then the upper mould part is set atop on these layers. When the leading edge of the layer stack is formed a flow pipe is integrated into the stack of fibre reinforcement layers so as to allow for distributing resin to the layers. This flow pipe will be part of the laminated wind turbine rotor blade after curing the resin.

WO 2006/058540 A1 describes a vacuum infusion method by means of a semi-permeable membrane. In this method, a mould is applied with a mould cavity, in which a fibre insertion is placed which comprises a plurality of fibre layers and a distribution layer. The distribution layer allows for a higher rate of flow for a liquid polymer than the fibre layers. Inlet channels are located atop of the fibre insertion. The liquid polymer is directed via the inlet channels to the distribution layer after the mould has been closed by use of a vacuum bag.

WO 2006/058541 A1 describes a method and an apparatus for producing fibre composite mouldings by means of vacuum infusion. In the method, a mould with a mould cavity, a plurality of inlet channels communicating with the mould cavity, and a polymer source with liquid polymer is applied. A plurality of vacuum channels communicates with the mould cavity and a vacuum source. Fibre material is inserted into the mould cavity prior to the process of filling said mould, and where a reduced pressure is generated in the vacuum channels and thus in the mould cavity with the result that liquid polymer is drawn from the polymer source via the inlet channels into the mould cavity. One or more of the inlet channels can also communicate with the vacuum source and/or one or more of the vacuum channels can also communicate with a polymer source.

WO 2007/038930 A1 describes a method for producing a fibre reinforced product. In the method, one or more layers of reinforcing fibres are placed into the cavity of a mould. The layers are covered with a resin distribution member over which a number of resin inlets which are formed by pipes are placed. The resin distribution member can be removed after producing the laminate. Alternatively, the resin distribution member and the inlets can remain part of the laminate. If the resin distribution system, i.e. the inlet pipes and/or the resin distribution layer, remains in the laminated structure, it adds to weight without providing a substantial structural benefit. On the other hand, if the resin distribution layer is removed from the laminated structure, this is an elaborate process since the distribution layer is provided on a large fraction of the finished structure's surface area.

SUMMARY OF INVENTION

It is therefore a first objective of the present invention to provide an advantageous means for producing fibre reinforced laminated structures. It is a second objective of the present invention to provide an advantageous method for vacuum assisted resin transfer moulding of a fibre reinforced laminated structure The first objective is solved by a mould for vacuum assisted resin transfer moulding of a fibre reinforced laminated structure. The second objective is solved by a method for vacuum assisted resin transfer moulding. The depending claims contain further developments of the invention.

According to the invention, a mould for vacuum assisted resin transfer moulding of a fibre reinforced laminated structure is provided. The mould comprises at least a first mould part and a second mould part where the first mould part defines a negative impression of the laminated structure, is structurally stable, and forms a support for fibre reinforcement layers of the laminated structure. The second mould part is connectable to the first mould part for closing the mould and defining together with the first mould part an enclosed space which can be evacuated. According to the invention, at least one flow duct for guiding a liquid polymer is formed as a recess in the first mould part and/or in the second mould part. The recess is open towards the enclosed space and extends along a section of the periphery of the first mould part and/or the second mould part.

In the inventive mould, the flow duct is located outside the actual volume of the finished fibre reinforced laminate structure but is part of the volume which will be evacuated. When forming the fibre reinforced laminated structure the flow duct is kept free of any material until the injection of resin starts. Thus, when the injection of the resin is started, the resin can run freely through the flow duct from an inlet port through which the flow duct is connected to a resin reservoir. As the flow duct is filled with resin, the slower process of resin flowing into the fibre and core materials of the laminated structure starts. Once the resin has cured and the mould has been removed the surplus resin which is the reminder of the resin in the flow duct can be removed by mechanical means. By using a flow duct which is part of the mould rather than of the moulded structure lay-up time for the layer stack, weight, costs and complexity of the laminated structure can be reduced.

The first mould part can, in particular, define the negative impression of a laminated structure having an elongated shape with a leading edge and a trailing edge. In this case, a first flow duct may be present in the first mould part and/or in the second mould part at a location where the leading edge is to be formed. Furthermore, a second flow duct may be present in the first mould part and/or in the second mould part at a location where the trailing edge is to be formed. The first and second flow ducts allow for introducing resin from the leading edge, as well as from the trailing edge into the fibre- and core materials of the layer stack in the mould. The use of the first and second flow ducts allow for reducing the infusion time making the use of cheaper, faster setting resins possible. The flow front is then essentially a combination of two more or less straight lines, parallel to the leading edge and the trailing edge, respectively. In combination with non-parallel leading and trailing edges this ensures that the flow fronts coalesce in a systematic, controlled manner, thereby minimising the risk of entrapping air.

The laminated structure with the elongated shape can, in particular, be a laminated wind turbine rotor blade.

In a first implementation of the inventive mould the second mould part is also structurally stable. This helps to prevent wrinkles in the finished laminated structure. Moreover, in this implementation a first recess can be formed in the first mould part while a second recess is formed in the second mould part. The first recess and the second recess are then located such in the respective first and second mould parts that parts of their open sides are aligned to each other when the mould is closed. In other words, when the mould is closed the first recess and the second recess together form the flow duct for the liquid polymer to be introduced into the stack of fibre- and core materials.

Like the first mould part, the second mould part can also define a negative impression of the laminated structure. Then, a mould core is present in addition to the first and second mould parts. The outer dimensions of the mould core are smaller than the inner dimensions of the first and second mould parts. The mould core may optionally be surrounded by an inflatable member. By using first and second mould parts which both define negative impressions of the laminated structure and the mould core, a whole closed structure can be formed in one moulding process. For example, if a wind turbine rotor blade is to be formed as the laminated structure the whole shell of the rotor blade can be formed in one moulding process. This overcomes the necessity of glue joints at the trailing edge and the leading edge of the rotor blade since the fibre layers can be dimensioned such that they can be wound around the core so as to overlap, for example, in the centre of the upper mould part. When forming the laminated structure the inflatable member can be used to press the stack of reinforcement- and core layers on the first and second mould parts. Inflating the inflatable member can be automatically done by evacuating the space between the first and second mould parts on the one side and the core on the other side. If the inflatable member has an internal pressure or a flow connection to air pressure reservoir, e.g. inside the mould core, the inflation will be self-affected by evacuating the space between the core and the first and second mould parts.

In a second implementation of the inventive mould the second mould part is a vacuum bag. In this case, the at least one flow duct is formed as a recess in the first mould part. By using a vacuum bag a mould core becomes unnecessary so that the number of mould parts can be reduced as compared to the first implementation. However, forming a laminated structure in which both ends of the fibre- and core layers of the layer stack overlap so as to form, e.g., a closed shell of a wind turbine rotor blade, is not possible so that glue joints will be necessary.

The inventive method for vacuum assisted resin transfer moulding of a fibre reinforced laminated structure uses an inventive mould. In the method, the at least one flow duct is kept free of any material until the resin is injected by injection means. The resin then runs in the at least one flow duct from an inlet port to the far end of the mould. When the resin has set, the mould parts are removed and the surplus resin in the at least one flow duct may be removed mechanically.

If at least two flow ducts are present, a resin reservoir may be connected to the at least two flow ducts in such a way that the resin is injected into the at least two flow ducts simultaneously.

BRIEF DESCRIPTION OF THE DRAWINGS

Further features, properties and advantages of the present invention will become clear from the following description of embodiments in conjunction with the accompanying drawings.

DETAILED DESCRIPTION OF INVENTION

Figure 1:
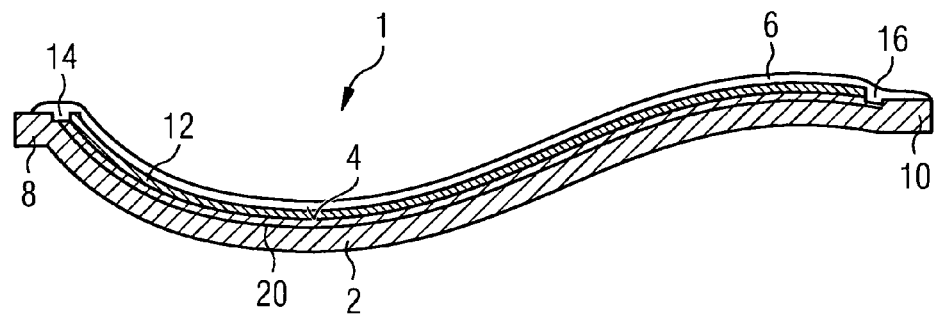
FIG. 1 shows a first embodiment of the inventive mould.

The first embodiment of the inventive mould is shown in FIG. 1. The figure shows a mould for a shell part of a fibre reinforced laminate wind turbine rotor blade. The shell part to be formed by the mould forms the pressure side of the later rotor blade, i.e. the side which shows substantially towards the direction from which the wind comes during operation of the wind turbine. A similar mould (not shown) will be used for forming the suction side shell part. The wind turbine rotor blade is then formed by joining the pressure side shell and the suction side shell by glue joints.

The mould 1 shown in FIG. 1 comprises a first mould part 2 which is made from a rigid and structurally stable material. The mould part 2 comprises an inner surface 4 which defines a negative impression of the wind turbine rotor blade's pressure side shell part. The surface 4 of the mould part 2 may be provided with a suitable release agent which allows for removing the pressure side shell part from the mould after the moulding process.

The mould 1 further comprises a vacuum bag 6 which may be fixed in a pressure tight manner to edges 8, 10 of the mould part 2. The vacuum bag 6 and the mould part 2 together define an enclosed space which can be evacuated through suitably placed vacuum channels (not shown in the figure).

Figure 2:
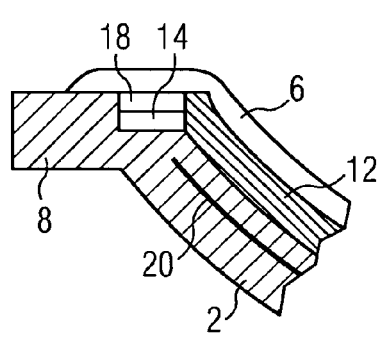
FIG. 2 shows a detail of FIG. 1
Figure 3:
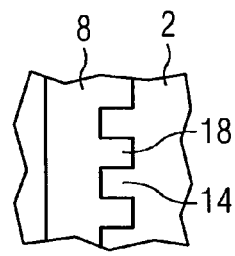
FIG. 3 shows the detail of FIG. 2 in a top view

The rigid mould part 2 is equipped with recesses 14, 16 which form flow ducts after evacuating the enclosed space. The flow ducts 14, 16 can be provided with spacer elements 18 which prevent the vacuum bag 6 from being sucked into the flow ducts 14, 16. The spacer elements 18 can be seen in FIGS. 2 and 3 which show an enlarged view of the flow duct 14 in a sectional view and in a top view, respectively.

For vacuum assisted resin transfer moulding of a wind turbine rotor blade as a fibre reinforced laminated structure a layer stack 12 is laid in the mould part 2. Then, the vacuum bag 6, which constitutes a second mould part in the present embodiment, is fixed airtight to the edges 8, 10 of the mould part 2, and the enclosed space between the mould part 2 and the vacuum bag 6 is evacuated. This leads to pressing the vacuum bag 6 against the layer stack 12 by means of the air pressure outside of the mould 1. Then, a liquid polymer is introduced into the flow ducts formed by the recesses 14, 16 from where it flows into the layer stack 12. The reservoir of the liquid polymer is connected to both flow ducts so that it can be injected into both flow ducts 14, 16, simultaneously. As the flow ducts become filled with the liquid polymer, the slower process of liquid polymer flowing into the layer stack 12 starts. The flow front of the resin is essentially a combination of two more or less straight lines, which run parallel to the leading and trailing edge of the shell part to be formed. When combined with non-parallel leading and trailing edges, this ensures that the flow front coalesce in a symmetric, controlled manner, thereby minimising the risk of entrapment of air.

When the layer stack 12 is fully wetted by the liquid polymer the liquid polymer is cured, for example by using heat or ultraviolet light. In the present case, heat is used which is applied by a heat transfer system 20 that may, e.g., be realised by heating filaments integrated into the mould part 2. After the resin is cured the mould will be removed again leaving surplus liquid polymer at the leading and trailing edges of the shell part. This surplus polymer is then removed by mechanical means.

The layer stack in the present embodiment can comprise one or more layers of fibre reinforced material onto which a core material is provided which may be made, e.g., from balsa wood or PVC foam.

Although the mould part 2 in FIG. 1 is realised as a single mould element it may as well be realised by a number of mould elements which are joined together to form the mould part 2.

Figure 4:
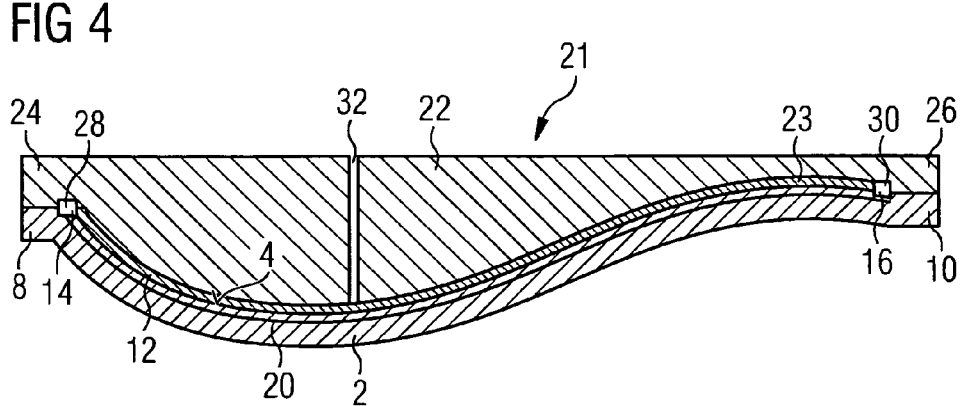
FIG. 4 shows a second embodiment of the inventive mould.

A second embodiment of the inventive mould will be described with respect to FIG. 4. The mould 21 comprises a first mould part 2 and a second mould part 22 which are both made from a structurally stable, rigid material. The first mould part 2 substantially corresponds to the mould part 2 of the first embodiment and will therefore not be described again. Moreover, the elements of the first mould part 2 as well as the layer stack 12 shown in FIG. 4 are designated with the same reference numerals as in FIG. 1.

The second embodiment differs from the first embodiment in that a second structurally stable, rigid mould part 22 is used instead of a vacuum bag 6 for closing the mould to form an enclosed space which can be evacuated. The second mould part 22 comprises a surface 23 that defines a positive impression of the wind turbine rotor blade's pressure side shell and edges 24, 26 which allow for joining the first mould part 2 and the second mould part 22 airtight so that an enclosed space is formed between both mould parts. Like the surface 4 of the first mould part 2 the surface 23 of the second mould part 22 may be provided with a suitable release agent for simplifying dismantling the finished shell part from the mould. The second mould part 22 further comprises a first recess 28 and a second recess 30 which are dimensioned and located such in the second mould part 22 that open sides of them are aligned with the recesses 14, 16 of the first mould part 2 so as to form flow ducts for the liquid polymer. Furthermore, the second mould part 22 is equipped with one or more suitably located vacuum pipes 32 for evacuating the enclosed space between the first and second mould parts 2, 22.

The process of vacuum assisted resin transfer moulding of the shell part is substantially the same as in the first embodiment and will therefore not be described again.

A third embodiment of the inventive mould and its use will be described with respect to FIGS. 5 to 9.

Figure 5:
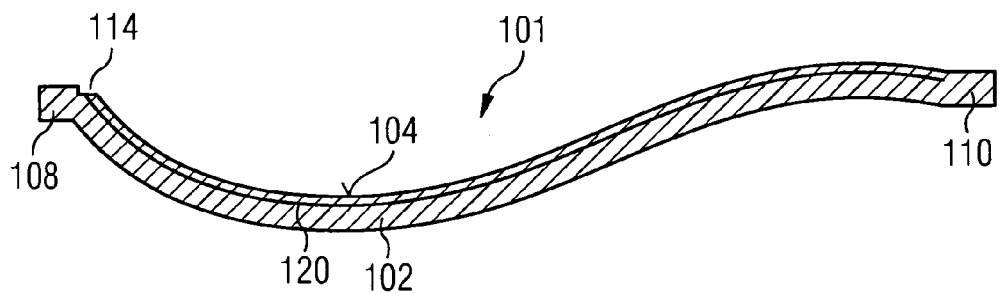
FIGS. 5 to 9 show a third embodiment of the inventive mould and its use for making a fibre reinforced laminated wind turbine rotor blade.
Figure 6:
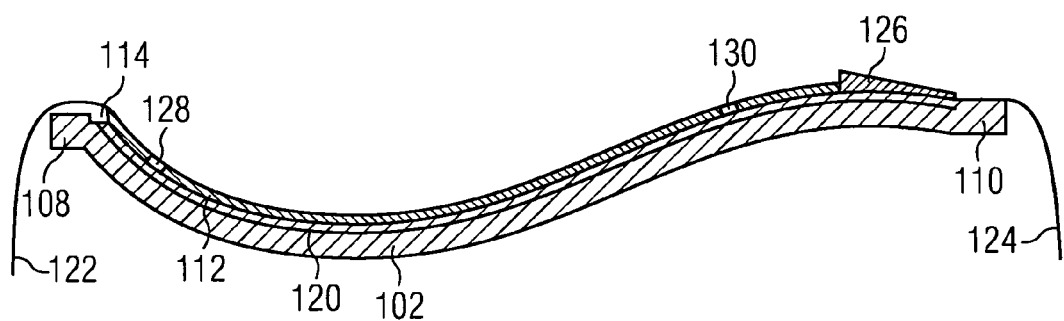

FIG. 5 shows a first mould part of the mould 101 according to the third embodiment which corresponds to the first mould parts of the first and second embodiments except for the fact that no recess 16 is present in the mould part's edge 110 that is located where the wind turbine rotor blade's trailing edge will be formed. The remaining parts of the first mould part 102 of the third embodiment correspond to the respective parts of the mould part 2 of the first and second embodiments and will therefore not be described again. Elements of the mould part 102 which correspond to the mould part 2 are designated with the reference numerals which are increased by 100 with respect to those used for the mould part 2.

A layer stack 112 is formed in the first mould part 102 (see FIG. 6) by first putting one or more layers of fibre reinforcement material in the mould, then putting a core material atop of these layers and then again one or more layers of fibre reinforcement material atop of the core material. The layers of fibre reinforcement material are dimensioned such that their end sections 122, 124 project over the edges 108, 110 of the mould part 102. At the edge 110 where the trailing edge of the wind turbine rotor blade is to be formed, a special core part 126 is put atop of the layers of fibre reinforcement material. To aid distribution of the liquid polymer during the moulding process, the layer stack may be equipped with transfer passages 128, 130 extending through the layer stack.

Figure 7:
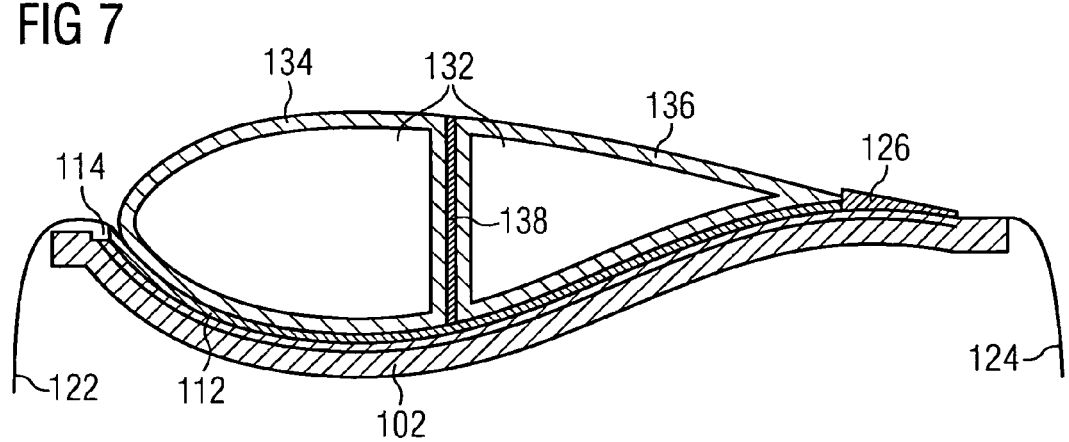

In the next step, as it is shown in FIG. 7, a mould core 132 is set onto the layer stack 112. In the present embodiment, the mould core 132 consists of a first and a second mould core part 134, 136 between which a shear web 138 is located. The shear web may consist of a layer stack with the same layer structure than the layer stack 112 in the first mould part 102. During the vacuum assisted resin transfer moulding process the shear web will be firmly joined to the shell of the wind turbine rotor blade to increase its stability. Although only one shear web 138 is present in the shown embodiment, two or more shear webs could be present as well.

The mould core parts 134, 136 are made from a structurally stable material like, for example, wood. Moreover, the structurally stable material may be surrounded by a flexible member like, for example, foam rubber. In addition, each core part 134, 136 is surrounded by a flexible membrane the outer surface of which may be treated with a suitable release agent. When the space between the mould parts and the mould core will be evacuated after closing the mould, the air pressure still present between the structurally stable material of the mould core parts 134, 136 and the flexible membrane will lead to an inflation of the membrane so that the layer stack surrounding the mould core parts 134, 136 is pressed against the respective mould parts.

Figure 8:
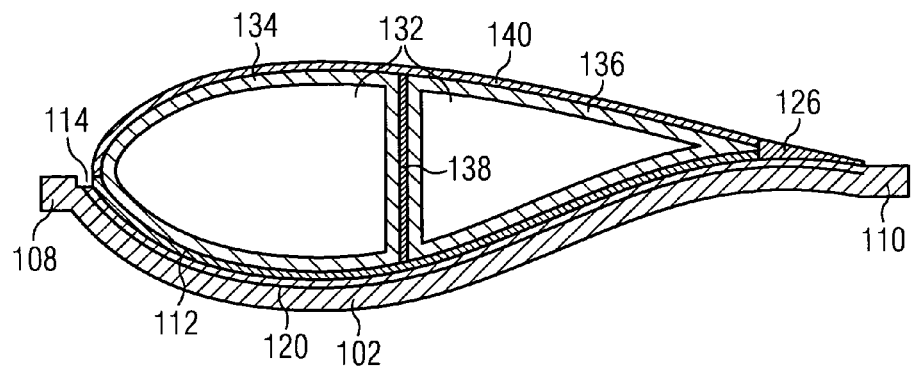

In a next step, as it is shown in FIG. 8, the top fibre reinforcement layers, i.e. those layers atop of the core material of the layer stack 112, are wound around the mould core 128 such that both ends of the layers overlap. Then, a core material is put atop of these layers and then the lower fibre reinforcement layers of the layer stack 112, i.e. those which are below the core material of this stack, are wound around the core material to form a layer stack 140, thereby overlapping in their end sections. In this way the whole shell of a wind turbine rotor blade can be made in form of a single laminate structure without the need of glue joints at the leading and trailing edges of the rotor blade.

Figure 9:
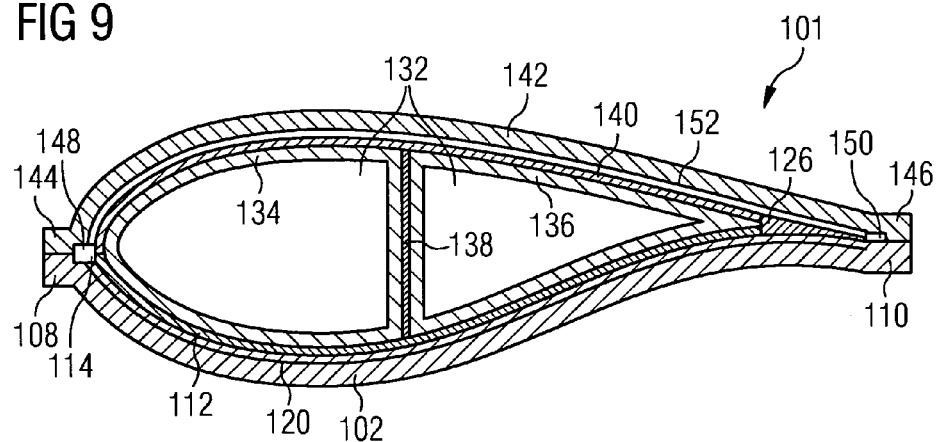

In a last step, as it is shown in FIG. 9, the second mould part 142 of the mould 101 is set atop of the layer stack 140. The second mould part 142 comprises edges 144, 146 by which the second mould part 142 can be joined airtight with the first mould part 102. Suitable vacuum channels (not shown) can be used for evacuating the space enclosed between the mould parts 102, 142. The second mould part further comprises a first recess 148 and a second recess 150. The location of the first recess 148 and its dimension are chosen such that an open side of the recess 148 is aligned with an open side of the recess 114 in the first mould part 102 when both mould parts are joined together. Hence, the recess 114 in the first mould part 102 and the recess 148 in the second mould part 142 form together a flow duct for liquid polymer at the leading edge of the wind turbine rotor blade to be formed which is open towards the space enclosed between the mould parts. In addition, the recess 150 in the second mould part 142 forms a further flow duct for liquid polymer which is located at the trailing edge of the wind turbine rotor blade to be formed.

After evacuating the enclosed space between the mould parts 102, 142 a liquid polymer is injected into the flow ducts which then flows into the layer stacks 112, 140 and the shear web 138. When the layer stacks 112, 140 and the shear web 138 are completely wetted by the liquid polymer, the liquid polymer is cured by applying heat via heat transfer systems 120, 152 present in the first and second mould parts 102, 142. Like in the other embodiments, the heat transfer system may be realised in form of heating filaments integrated into the mould parts 102, 142. When the liquid polymer is cured the mould parts 102, 142 and the mould core parts 134, 136 are removed. After removing the mould from the wind turbine rotor blade surplus polymer material remains at the leading edge and the trailing edge of the wind turbine rotor blade. This surplus polymer material is then removed mechanically.

The inventive mould allows for forming fibre reinforced laminated structures by using a vacuum assisted resin transfer moulding process without leaving flow pipes in the finished structure. Moreover, removing the surplus resin material is easier and less elaborate than removing flow pipes used in the state of the art moulding processes.

The invention claimed is:

1. A mould for vacuum assisted resin transfer moulding of a fibre reinforced laminated structure, comprising:
   a first mould part defines a negative impression of the fibre reinforced laminated structure, the first mould part structurally stable and forms a support for fibre reinforcement layers of the fibre reinforced laminated structure;
   a second mould part connectable to the first mould part in order to close the mould and together with the first mould part defines an enclosed space to be evacuated;
   a flow duct that guides a liquid polymer, the flow duct is open towards the enclosed space and is formed as a recess in the first mould part extending along a section of a periphery of the first mould part and/or a formed as a recess in the second mould part and extending along a section of the periphery of the first mould part; and
   a spacer element forming a portion of the flow duct, said spacer element configured to prevent the second mould part from entering the flow duct after the enclosed space has been evacuated.

2. The mould as claimed in claim 1,
   wherein the first mould part defines the negative impression of a laminated structure having an elongated shape with a leading edge and a trailing edge,
   wherein the flow duct includes a first flow duct and a second flow duct,
   wherein the first flow duct is in the first mould part and in the second mould part at a location where the leading edge is to be formed, and
   wherein the second flow duct is in the first mould part and in the second mould part at a location where the trailing edge is to be formed.

3. The mould as claimed in claim 2, wherein the first mould part defines the negative impression of a laminated wind turbine rotor blade.

4. The mould as claimed in claim 2, wherein the second mould part is a structurally stable mould part.

5. The mould as claimed in claim 4, further comprising:
   a first recess formed in the first mould part; and
   a second recess formed in the second mould part,
   wherein the first recess and the second recess are located in the respective first and second mould part that an open part of the first recess aligns with an open part of the second recess when the mould is closed.

6. The mould as claimed in claim 4,
   wherein the second mould part further defines a negative impression of the fibre reinforced laminated structure, and
   wherein a mould core is defined having outer dimensions of which are smaller then the inner dimensions of the first and the second mould parts.

7. The mould as claimed in claim 5,
   wherein the second mould part further defines a negative impression of the fibre reinforced laminated structure, and
   wherein a mould core is defined having outer dimensions of which are smaller then the inner dimensions of the first and the second mould parts.

8. The mould as claimed in claim 6, wherein the mould core is surrounded by an inflatable member.

9. The mould as claimed in claim 1,
   wherein flow duct is formed as a recess in the first mould part; and
   wherein the second mould part is a vacuum bag.

10. A mould for vacuum assisted resin transfer moulding of a fibre reinforced laminated a structure which is a laminated wind turbine rotor blade, comprising:
    a first mould part defines a negative impression of the wind turbine blade having an elongated shape with a leading edge and a trailing edge, the first mould part structurally stable and forms a support for fibre reinforcement layers of the wind turbine blade;
    a second mould part connectable to the first mould part in order to close the mould and together with the first mould part defines an enclosed space to be evacuated;
    a plurality of flow ducts that guides a liquid polymer, each flow duct is open towards the enclosed space and is formed as a recess in the first mould part extending along a section of a periphery of the first mould part and/or a formed as a recess in the second mould part and extending along a section of the periphery of the first mould part; and
    a spacer elements forming a portion of at least one flow duct, said spacer element configured to event the second mould art from entering the flow duct after the enclosed space has been evacuated;
    wherein the plurality of flow ducts includes a first flow duct and a second flow duct,
    wherein the first flow duct is in the first mould part and in the second mould part at a location where the leading edge is to be formed; and
    wherein the second flow duct is in the first mould part and in the second mould part at a location where the trailing edge is to be formed.

11. The mould as claimed in claim 10, further comprising:
    a first recess formed in the first mould part; and
    a second recess formed in the second mould part,
    wherein the first recess and the second recess are located in the respective first and second mould part that an open part of the first recess aligns with an open part of the second recess when the mould is closed.

12. The mould as claimed in claim 9,
    wherein flow duct is formed as a recess in the first mould part; and
    wherein the second mould part is a vacuum bag.

* * * * *